FIG. 2.

July 6, 1943.  A. H. MASCHMEYER  2,323,824
CODE INTERPRETING MECHANISM
Filed Feb. 15, 1938   7 Sheets-Sheet 6

INVENTOR
AUGUST H. MASCHMEYER
BY *H. A. Spark*
ATTORNEY

Patented July 6, 1943

2,323,824

UNITED STATES PATENT OFFICE 2,323,824

CODE INTERPRETING MECHANISM

August H. Maschmeyer, Brooklyn, N. Y., assignor to Remington Rand Inc., Buffalo, N. Y., a corporation of Delaware Application February 15, 1938, Serial No. 190,589

13 Claims. (Cl. 235—61.6)

This invention relates to improvements in mechanism for interpreting combinational code. The present application illustrates the invention applied to a record card controlled tabulating machine similar to that disclosed in the Lasker and Mueller application, Serial No. 174,354, filed November 13, 1937.

In that application sets of six permutation bars are influenced by the analysis of a punched card and control feeler bars which constitute stops, which, in turn, variably arrest so-called differential bars. These differential bars are disposed in a series across the machine and they actuate the totalizers and carry the printing type. Each differential bar is associated with a set of six permutation bars and is adapted to be arrested in any one of thirty-six positions. To this end, the permutation bars are designed so as to permit each stop two extents of movement to arrest the differential bar in two positions, hence, eighteen stops are employed to control the thirty-six positions.

The primary object of the present invention is to reduce the number of stops and to provide improved means to position the differential bars.

In the specific instances of the present invention illustrated, each stop is settable under the control of the permutation bars to four positions, so that only nine stops are required to control the thirty-six positions of each differential bar.

The invention is shown in the drawings and will be described herein as applied to a machine substantially the same as that disclosed in the above application although it will be obvious that it may be applied, with or without modification, to other machines which require permutation bars for translating code.

In prior permutation bar constructions, it has been common practice to notch the edge of each bar in accordance with the code employed. The bars are adapted to be raised or displaced according to codical representations which physically, in this instance, are the perforations in a card, although it is obvious that the permutation bars may be operated by any suitable means. So-called stops are associated with the notches of the permutation bars, and, when said bars are raised or displaced, the stops have a cross-combing action imparted to them and sense or analyze the displaced notches of the bars. The stop associated with the notches corresponding to the codical representation presented to the permutation bars is allowed to advance a greater distance (the depth of the notches) than the remaining stops and controls whatever mechanism desired.

In many instances of the prior art, the permutation bars were constructed to permit each stop to be influenced by only one codical representation. In other instances, the construction of the permutation bars was such that by displacing them varying distances, varying depth of notches was brought into play which permitted each stop to have different extents of movement and, therefore, more than one codical representation could influence one stop. In some instances of the prior art, the presentation of one codical representation to the permutation bars would effect the release of two or more stops. This was compensated for, however, by arranging the stops in a suitable order so that the stop purposely released took precedence over the stop accidentally released. In the preferred form of the present invention only one stop is released at a time.

An object of the present invention is to overcome the above difficulties and obtain four values for each stop without limiting the available codical representations with which to represent the complete alphabet and the ten numerals, and preferably to prevent the release of more than one stop at a time, and to do these things by means which are economical to manufacture, simple and compact in construction and direct-acting in operation.

Another object of the invention is to analyze by improved means a six-point code in which the letters of the alphabet and the ten numerals are represented by using only the representations of one-, two-, and three-point designations. Said representations are arranged in groups derived from root designations in such a manner as to exhaust in each group all of the possible combinations of each root with the designations included in the group.

These and other objects will be apparent from the description which follows, when read in conjunction with the accompanying drawings.

In the drawings,

Figs. 1 to 9, inclusive, illustrate the preferred form of the invention and Figs. 10 and 11 show a modification which utilizes the regular Powers numerical 90-column code.

Fig. 4 is a cross sectional view taken on line 4—4, Fig. 3, showing the mechanism for releasing and retracting the stops;

Figs. 13 and 14 are fragmentary views on an enlarged scale and showing a modified form of lifting pins for raising the code bars.

Fig. 14 is a side view of a set of said pins, and Fig. 13 a horizontal section on the line 13—13 of Fig. 14 and looking upward.

Figure 1:
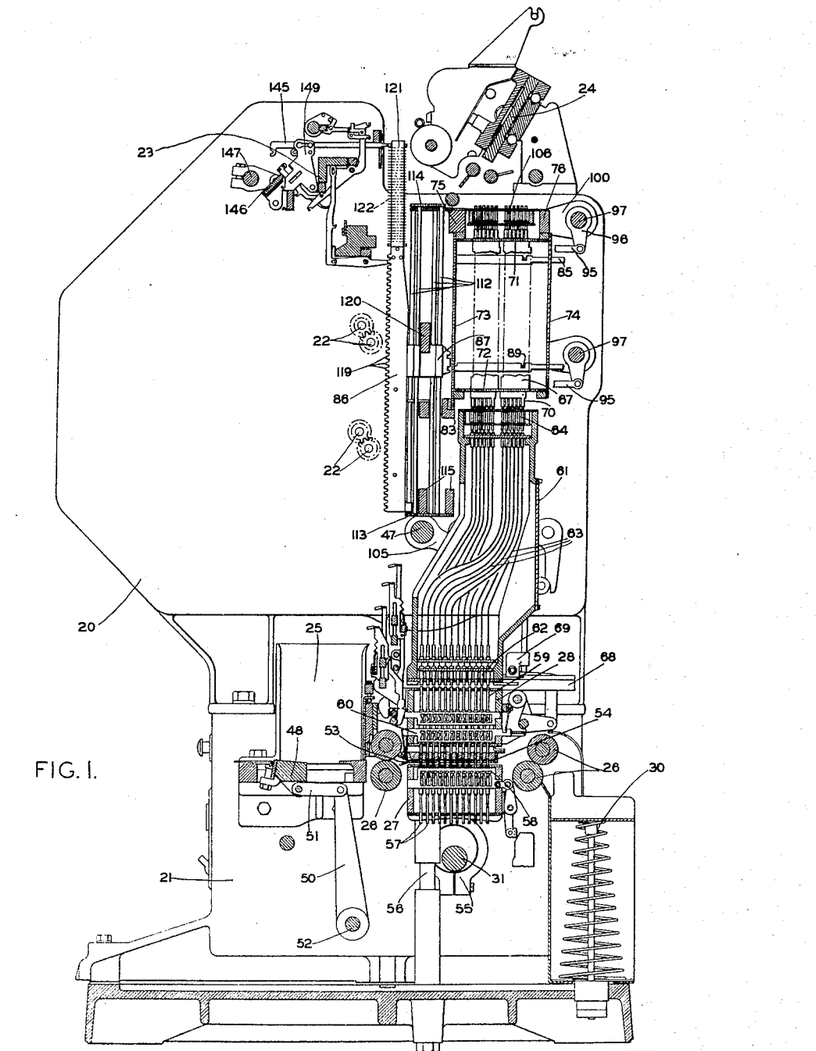
Fig. 1 is a vertical cross sectional view of a tabulating machine of the type disclosed in the above mentioned Lasker-Mueller application, showing the permutation bars and their associated stops in normal position and the means for operating and supporting said permutation bars.

Referring to Fig. 1 of the drawings, a tabulator head mechanism, similar to that disclosed in the Lasker-Mueller application is housed between two side frames 20, which are supported by two base side frames 21. The head mechanism consists briefly of totalizers 22, printing mechanism 23, paper carriage 24 and various control mechanisms, all described and claimed in the above application.

A well known type of Powers tabulator base mechanism is housed between the two base frames 21 (Figs. 1 and 2) and comprises briefly a card hopper 25, feed rollers 26, sensing pin-box 27, set pin-box 28 and card eject pocket 30, all as described in Patent No. 2,044,119 to Lasker, issued June 16, 1936.

A base drive shaft 31 (Fig. 2) has fixed at its outer end a worm-wheel 32 which is driven from a worm 33 mounted on a power shaft 34. The power shaft receives its power from any suitable source by the belt 35 and is provided with a suitable clutch mechanism 36. Worm-wheels 37 are mounted on said power shaft and engage pinions 38 fixed to the feed roller shafts to drive the feed rollers, and the skid rollers are driven from the worm 33 by means of the pinions 40, all as described in the above Lasker patent. A shaft 41 is driven from the power shaft 34 by two meshing bevel gears 42 and at its upper end drives the power shaft 43 of the head section through the medium of the bevel gears 44. A worm 45 is fixed to the shaft 43 and drives a worm wheel 46 fixed to the cross shaft 47.

The cards are stacked in the hopper 25 (Fig. 1), the front edge of the lowermost card being engaged by a picker knife 48, which is connected to an arm 50 by a tie link 51. The arm 50 is fixed to a shaft 52 which is oscillated by mechanism not shown in this application, but described in the above Lasker patent. Oscillation of the shaft 52 will cause the cards to be fed out of the hopper 25 one at a time where they are caught by the feed rollers 26 and carried into a sensing chamber 53. Skid rollers, not shown, are provided to convey the cards into and out of the sensing chamber. A card-stop gate 54 is controlled by suitable mechanism so as to close and retain a card in the sensing chamber while it is being sensed and to open for a brief period in the cycle to allow the sensed card to be ejected into the eject pocket 30, and to close again immediately after the removal of the card sensed and retain the next card within the chamber for the sensing operation.

The base drive shaft 31 has suitable eccentrics 55 mounted thereon, which are connected to each end of the sensing pin box 27 and upon rotation of the shaft 31 will impart a vertical reciprocating movement to said pin box which is guided by the posts 56. The sensing pin box moves upwardly, at a time when a card is being held in the sensing chamber 53 by the card stop gate 54, and pins 57 carried by the sensing pin-box penetrate the perforations in the card. All of the pins 57, which pass through perforations in the card, are locked in position by a locking slide 58 and are positively elevated by the continued vertical reciprocation of the pin-box 27. All of the pins which fail to penetrate the card will be arrested thereby, and will yield against the tension of light springs. The continued vertical movement of the sensing box 27 will cause the pins 57 to elevate set pins 59 of the set pin-box 28. The pins 59 are adapted to be locked in their uppermost position by locking slides 60, two of which are provided for each individual front-to-rear row of pins 59. The pins will remain locked in their uppermost position until different perforations are sensed in a succeeding card which causes the pins to be released and the new set of pins are latched in the uppermost position by mechanism described in Patent No. 2,044,119 to Lasker.

A translator 61 is located immediately above the set-pin box 28 and is provided with lower pins 62 which are in vertical alignment and adapted to cooperate with the pins 59 of the said pin-box. Bowden wires 63 are disposed vertically above the lower pins 62 and cooperate with upper pins 64 (Fig. 5) which, in turn, cooperate with permutation bars 67. The translator shown in the present application is substantially the same as that disclosed in the Lasker-Mueller application, and is held in the machine in the usual manner by the guideways 68. Finger pieces 69 afford a suitable means for detachably locking the translator in place.

The permutation bars 67 (Fig. 5) are arranged in sets of six, each bar of each set being provided with a depending finger 70, which cooperates with an upper pin 64 of the translator 61, there being a set of six bars cooperating with the front six pins and another set of six bars cooperating with the rear six pins of a frontto-rear row of pins 64. For ease of repair these tandem sets of permutation bars are arranged in units of ten denominations each. In the present instance there are ten such units disposed across the machine and as all units are constructed and operated in the same manner, a description of one will suffice for all.

Figure 5:
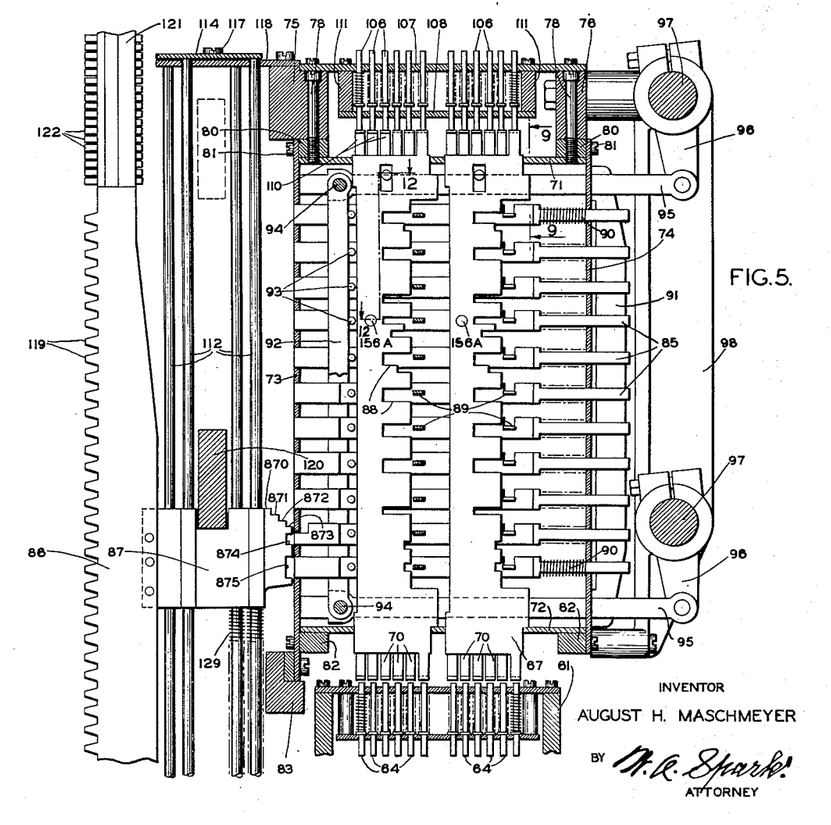
Fig. 5 is a sectional view through a permutation bar unit on a larger scale than the preceding views.
Figure 6:
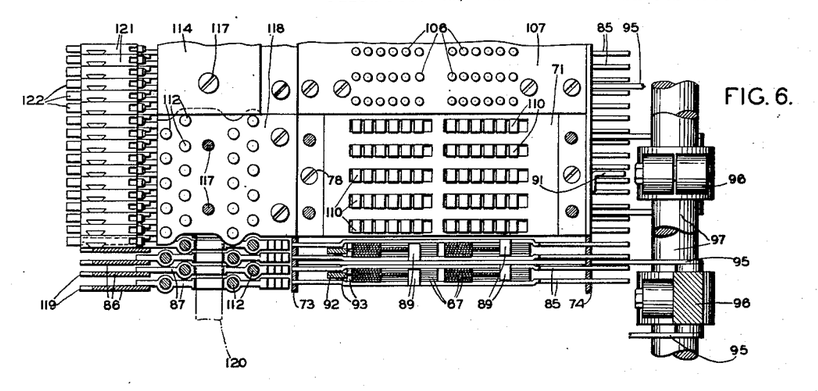
Fig. 6 is a plan view of Fig. 5, partly in section.

The framework of each permutation bar unit comprises upper and lower plates 71 and 72, and front and rear plates 73 and 74 (Fig. 6). The upper plate 71 is secured to upper tie rails 80 and the lower plate 72 to tie rails 82, to which tie rails the front plate 73 and rear plate 74 are also secured, the whole making a rectangular frame. Upper rails 75 and 76 extend across the machine and serve to support each unit at its upper end, and are secured to brackets 77 which are mounted one on each of the head side frames 20 as is clearly seen in Fig. 4. Each unit is secured to these bars or rails by screws 78. A lower cross-rail 83 (Fig. 4) extends across the machine and is secured to bars 84, one of which is mounted on each of the head side frames 20. The cross-rail 83 (Fig. 5) serves as a supporting piece to which the lower end of the plate 73 is secured.

Stops or feeler bars 85 extend through the plates 73 and 74 and are slidably guided thereby at their extremities. The stops 85 are arranged in tiers and each tier cooperates with one set of permutation bars 67 and is adapted to control the positioning of a differential bar 86 by arresting the plate 87 fixed thereto.

Figures 7, 8, 9:
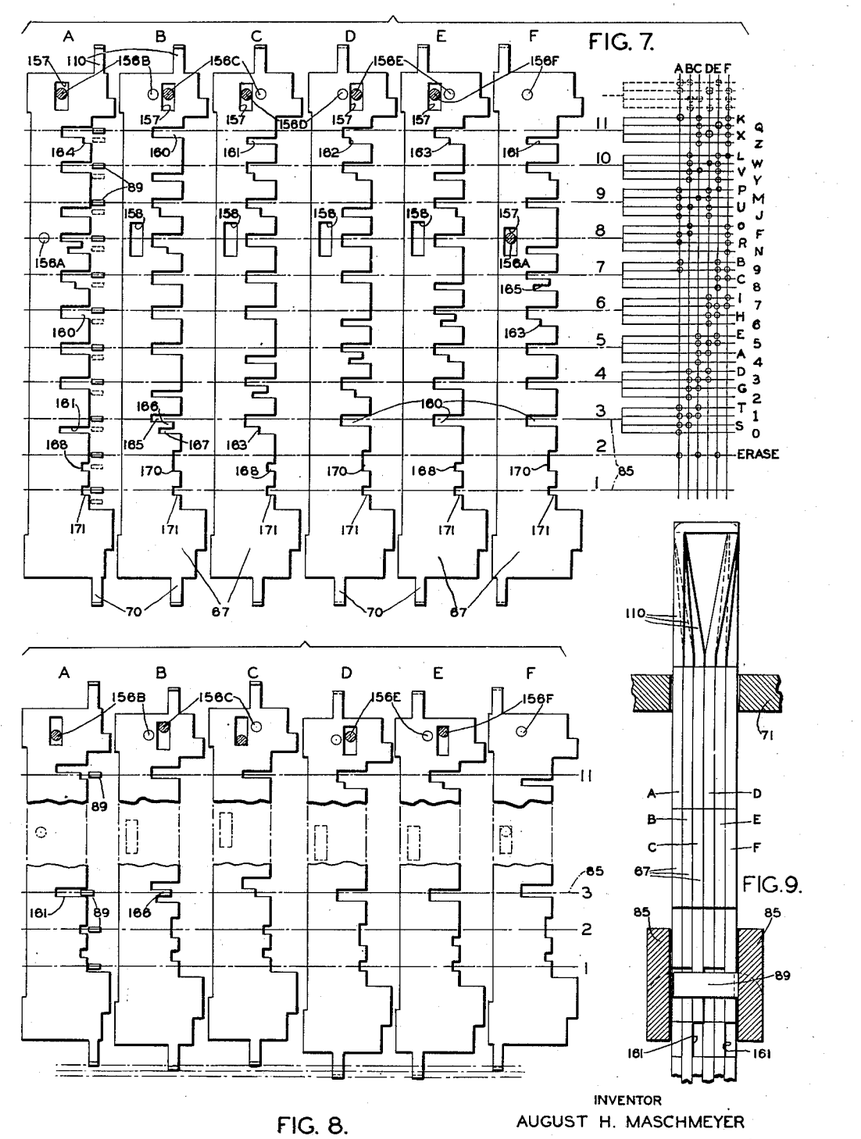
Fig. 7 is an elevational view showing the six permutation bars comprising a set, and showing the development of a six-point code along the right-hand edges thereof, together with a diagram illustrating the allotment of the various groups of codical representations to the stops.
Fig. 8 is a fragmentary view of Fig. 7, showing the positions of the permutation bars when a certain codical representation is presented to them.
Fig. 9 is a greatly enlarged cross-sectional view taken on line 9—9, Fig. 5.

Two tiers of stops 85 are disposed, one on each side of the two tandem-arranged sets of permutation bars 67, and each stop is provided with an ear 89 bent off at right-angles therefrom and of sufficient length to span one set of permutation bars as clearly shown in Figs. 6 and 9. The ears associated with the front and rear sets of permutation bars are necessarily bent-off in opposite directions and cooperate with notches 88 cut into one face of the said bars in a manner to be described later. It is sufficient to say at this time that the permutation bars are adapted to be raised by the various pins previously described in accordance with the perforations in a card and after the bars are raised, the stops are released, and move toward the notched edges of the permutation bars under the influence of springs 90 and the stop associated with the notches corresponding to the perforations sensed in the card will be permitted one of four extents of movement determined by the notches 88 and will be extended into the path of plate 87 to arrest said plate by engaging one of its four shoulders 870, 871, 872 and 873 and position the differential bar, 86. A rib 91 is secured to the back of the plate 74 to resist the strain on said plate caused by the multiple tension of the springs 90.

Vertical bars 92 are disposed between each pair of tiers of stops and normally retain the stops 85 in their retracted positions against the tension of the springs 90, as shown in Fig. 5 by arresting pins or extrusions 93 extending inwardly from opposite sides of said stop as seen in Fig. 6. Each end of each vertical bar 92 is connected to a short rod 94, which rods are of a length sufficient for one permutation bar unit and which, in turn, are connected to horizontal bars 95 which are guided in the plates 73 and 74 and extend rearwardly therefrom and are pivoted to arms 96 fixed to the rocker shafts 97. It will thus be seen in Fig. 5 that by rocking the rocker shafts 97 in a clockwise direction, the vertical bar 92 will be caused to move forwardly away from the pins 93 and allow the stops 85 to sense the notches 88 on the permutation bars.

Figure 3:
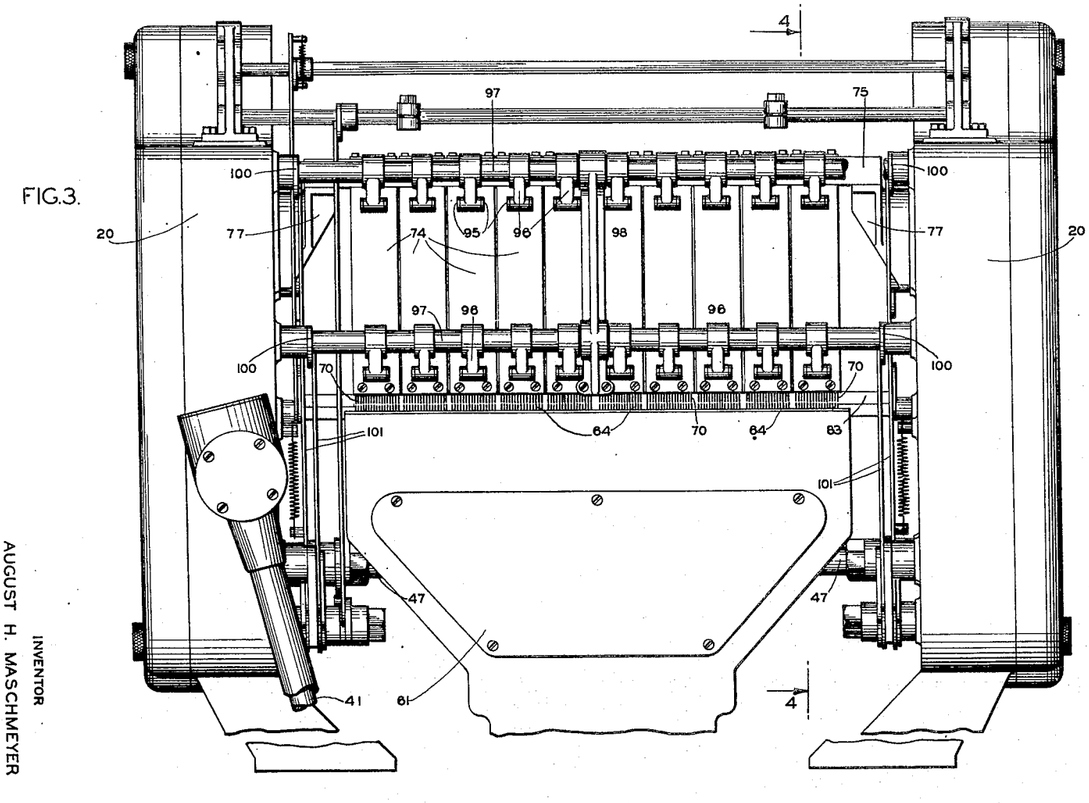
Fig. 3 is a rear elevational view showing the transverse disposition of the permutation bar units.
Figures 4, 13, 14:
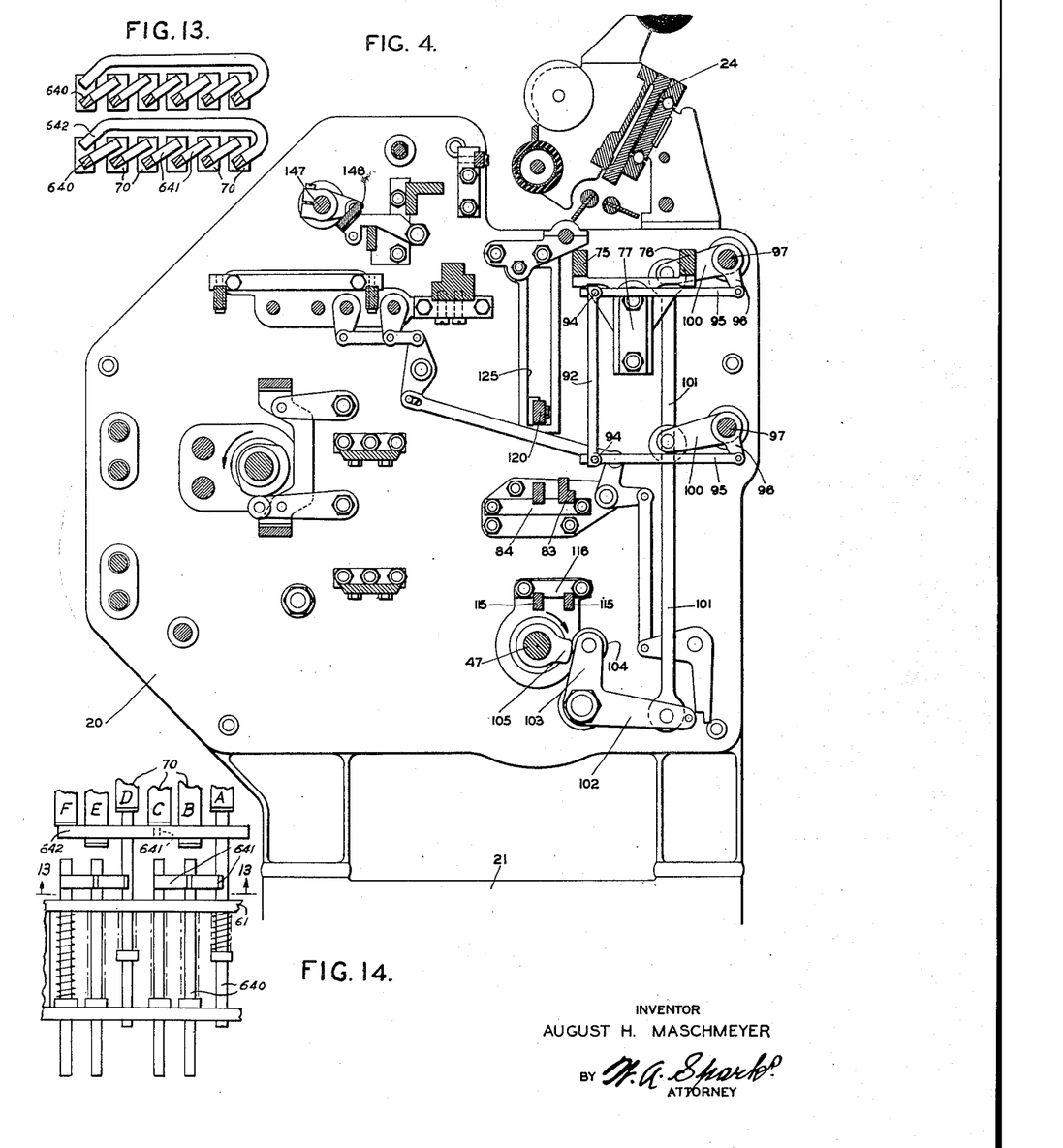

The mechanism for rocking the shafts 97 to release and retract the stops 85 will now be described with reference to Figs. 3 and 4. The rocker shafts 97 extend across the machine and are journalled in the side frames 20 and are supported against flexure by an intermediate bracket 98 (Figs. 4 and 5). The outer ends of the rocker shafts have fixed thereto arms 100, which are connected to vertical links 101 connected to the arm 102 of a bell-crank 103. The other arm of the bell-crank 103 carries a roller 104 which rolls on the periphery of the cam 105 fixed to the drive shaft 47. It will be noted in Fig. 4 that the high portion of the cam 105 retains the stops 85 in their retracted position, but, when power is applied to the shaft 47, causing the cam 105 to rotate in the direction of the arrow, that the roller 104 will roll to the lower portion of the cam, causing the bell-crank 103 to rock counter-clockwise and permit the links 101 to rise and rock the arms 100 and rocker shafts 97 clockwise, thus releasing the stops to sense the notches of the permutation bars.

The permutation bars 67 are provided at their uppermost ends with means, individual to each unit, for restoring the permutation bars after they have been raised by the various pins and associated elements as previously described. Spring urged pins 106 are guided between two plates 107 and 108 and cooperate with the upper fingers 110 of the permutation bars 67. These two plates are of a width sufficient for one permutation bar unit and are connected together by the rails 111. The plate 107 is provided with wing-like extensions which are fastened to the cross-rails 75 and 76, thus supporting the unit in the machine.

When the permutation bars are assembled in the machine, the upper and lower fingers (110 and 70, respectively) of the permutation bars, necessarily assume an oblique line and, therefore, are suitably bent-off to lie in uniform rows as shown in Figs. 6 and 9, to afford proper cooperation with the pins 106 and 64.

The differential bars 86 (see Figs. 1, 5, and 6) are each provided with a plate 87 fixed near its center and guided on a pair of guide rods 112, which are retained, and supported between two plates 113 and 118. The guide rods 112 are arranged in staggered relationship to permit compact assembly, as shown in Fig. 6. The plates 113 and 118 are of sufficient length to support ten pairs of guide rods corresponding to ten differential bars which are associated with one unit of permutation bars. The lower plate 113 is fixed by screws or otherwise removably secured to a pair of rails 115 each of which is mounted at each end on bars 116, one bolted to each head side frame 20. The upper plate 118 is fastened by a screw to the frame rail 75. Another plate 114 is fastened by screws 117 to the plate 118 and retains the rods 112 in position in the manner shown in Fig. 5. Compression springs 129 extend between the guide plate 87 and the retaining plate 113 and serve to urge the differential bars 86 to follow the vertical reciprocations of a restoring bar 120 which is actuated by mechanism to be presently described.

The forward edge of the lower portion of the differential bars 86 is cut in the form of rack teeth 119, which in general practice will probably actuate totalizers indicated at 22 (see Fig. 1). The upper portion of each differential bar constitutes a type bar 121 which carries a series of vertically spaced printing types 122.

Figure 2:
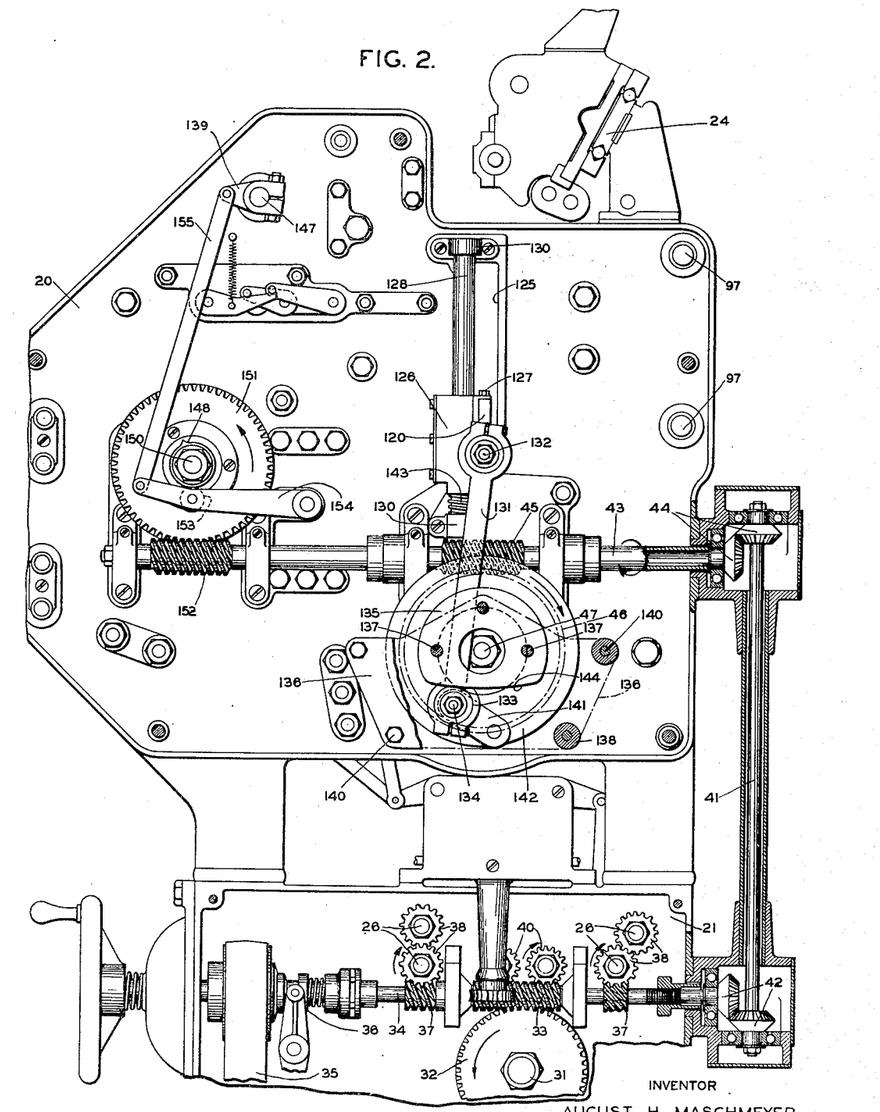
Fig. 2 is a side elevation of the machine with the casings removed and some parts in section.

Mechanism employed to vertically reciprocate the restoring bar 120 (Fig. 2) is provided on each side of the machine and is identical in construction and operation to that described and claimed in the co-pending Lasker-Mueller application. The restoring bar 120 extends across the machine and protrudes sufficiently through an aperture 125 to be fixed to a sliding bracket 126 by a screw 127. The bracket 126 is guided on a fixed post 128 which is mounted in suitable brackets 130 secured to the head side frames 20. A link 131 is pivoted at its upper end to the sliding bracket at 132, and at its lower end it is pivoted to a stud 134 which carries a roller 133, said roller being adapted to follow the contour of a fixed cam 135. The fixed cam 135 is secured to a plate 136 (shown partly broken away in Fig. 2) by suitable fastening devices such as posts 137. The plate 136 is fastened by bolts 140 to bosses 138, cast out from the head side frames 20. The stud 134 which carries the roller 133, is fast on a link 141, the other end of which is pivoted to a flange 142 on the worm gear 46. A stiff compression spring 143 which encircles the fixed post 128 and rests on the lower bracket 130 tends to hold the roller 133 against the lower dwell portion 144 of the cam 135, when the mechanism is in the position illustrated in Fig. 2. The construction is such that rotation of the shaft 47 will cause the roller 133 to rotate about and follow the contour of the fixed cam 135 through the medium of the link 141. The lower portion of the cam 135 is arcuate with a radius described from the center of the pivot 132 when the pivot is in its lowermost position as shown in Fig. 2. During the time the roller is on this portion of the cam, the link 131 will swing idly about the pivot 132 and the restoring bar remains stationary at its lowermost position, shown in Fig. 5. It is during this idle period of the restoring bar that the stops 85 of the permutation bar unit are retracted and the permutation bars restored to normal, and again displaced by the sensing of a new card and the stops 85 again released to sense the permutation bars and be extended to position the differential bars.

The type 122 may be driven against the paper by any of the well known printing devices. The one partially shown and described herein is copied from the Lasker and Mueller application. As shown in Figs. 1, 2, and 4, it comprises firing pins 145 which are adapted to be thrown against the ends of the type 122 by a clockwise rocking of a pressure bar 146, which is a bail bar having arms extending rearward and downward and pivoted to frames 20. This bail is connected by short links to arms extending rearward from a rockshaft 147 pivoted in said frames 20. Said shaft 147 may be rocked by the cam 148 mounted on the shaft 150 which obtains power from the power shaft 43 through the medium of the worm wheel 151 and worm 152. The cam 148 influences a roller 153 mounted on an arm 154 which is pivoted to the frame 20 and is connected at its free end to a link 155. The link 155 is, in turn, connected to an arm 139 fixed to the shaft 147. Rotation of the shaft 150 in the direction of the arrow will cause the cam 148 to pull down the link 155 to rotate the shaft 147 counter-clockwise and the bail 146 clockwise. Said bail is adapted to rock levers 149, each connected to a firing pin 145 by a pin and slot and a stiff spring. This specific mechanism is fully described and claimed in the prior Lasker-Mueller application, including means for determining which of the firing pins shall be actuated, etc. The details are not here described. For the purpose of the present invention, any suitable type hammer mechanism may be used.

Attention is now directed to Fig. 7, which illustrates the development of a six-point code worked out along the right-hand edges of one of the sets of six permutation bars in accordance with the present invention. The machine to which the invention is shown applied, is controlled by record cards having data represented therein by holes punched as shown diagrammatically at the right of Fig. 7. According to the terminology employed in this specification, each of these holes is called a "designation." A hole used to represent a letter or numeral, or a combination of holes so used is called a "representation." Thus, a single hole in position D serves as a representation of the numeral 6, and a combination of holes in positions B, E, F, as a representation of the letter L. These representations are momentarily transferred to the present improved translating mechanism in the form of suitable displacements of the code bars 67 as will be explained in detail. In machines of the general class in question, codical designations are utilized in a variety of forms, including besides perforations, pencil marks on a card, or black spots on a card, or serrated edges of a card; and such designations have been read out, not only by mechanical sensing pins, but also by brushes in electric circuits and by pneumatic means, and by photo-electric means. For the purposes of the present invention, it is immaterial what form of designation is employed and by what details of mechanical, electric, or pneumatic means the code bars 67 are displaced.

By using the type of six-point code employed, it is possible to obtain forty-one different codical representations (forty-two should the blank be used), by using only the representations of one, two, and three-point designations, as shown in the diagram at the right of Fig. 7. In the present instance, only thirty-seven of the available forty-one representations are utilized, the remaining four being discarded although they may be used if so desired without any extensive changes. One of the thirty-seven representations is used as an erasing or disabling feature which will be described later; and of the remaining thirty-six, twenty-six are used to represent the letters of the alphabet and ten are utilized to represent the numerical characters. In Fig. 7, the permutation bars are shown segregated for the purpose of illustration, although actually when they are assembled in the machine, they are stacked face to face in the order appearing in Fig. 9, although the permutation bars may be stacked in any desired order.

To facilitate the description to follow, the permutation bars 86 are lettered A to F, and the stops 85 are represented by dot-dash lines and are numbered 1 to 11, inclusive. Stops 1 and 2 prevent any movement of the differential bar 86 and only stops 3 to 11 will be discussed at this time.

Figures 11, 12:
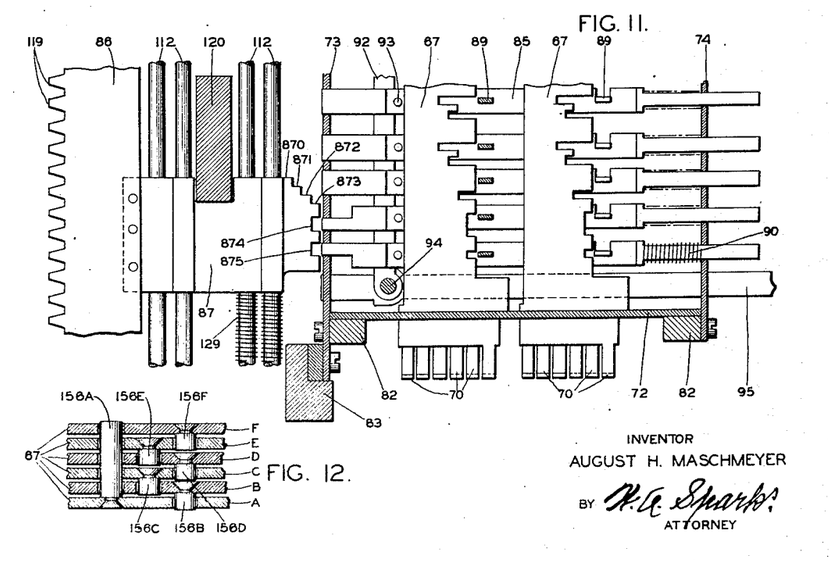
Fig. 11 is a cross-sectional view of the lower portion of a permutation unit showing the changes in construction necessary for the modification embracing Powers numerical 90-column code.
Fig. 12 is a greatly enlarged plan section taken on line 12—12 of Fig. 5 with the permutation bars assumed to be segregated to show the connections of the half-lift pins.

It may be brought out at this point that, whenever a permutation bar is raised by a pin penetrating a perforation in a card, by a pin and slot connection, the bar raised will half-lift the permutation bar preceding it. That is to say, whenever the B-bar is raised, it will cause the A-bar to be raised one-half of the distance of its normal lift. Likewise, C-bar will half lift B, D-bar will half lift C, E-bar will half lift D, F-bar will half lift E, and the A-bar will half lift F. Referring to Figs. 7 and 12, it will be noted that the bar B is provided with a pin 156B which extends into a slot 157 cut in bar A. The distance between the top of the pin 156 B and the top of the slot 157 is equal to one-half of the amount of the normal upward movement or lift of the permutation bars, and, consequently, when bar B is raised, it will carry bar A with it during the last half of its movement and raise the bar A to a mid-position. For a similar purpose bar C is provided with a pin 156C which engages a slot 157 in bar B; bars D, E, and F are provided with similar pins 156D, 156E, and 156F, respectively, which engage slots 157 in the adjacent bars. The bar A has a pin 156A which passes freely through slots 158 of added length and engages the slot 157 in bar F, so that, when A is lifted by a translator wire, it will impart a half-lift to F, but not to the other bars.

Each stop is adapted to arrest the plate 87 and bar 86 in four different printing positions and, therefore, the spacing of the stops 85 is equal to the spacing of four printing type 122, which, in the specific machine illustrated, is equal to two tooth spaces of the rack 119. Each stop is controlled according to four different code combinations, one combination for each of its four positions. For simplicity in expression, the term "combination" will be used to apply to any codical representation whether it be a one-, two-, or three-point designation. The term "combination group" will be used to apply to a group of four combinations according to which each stop is controlled. Stops 3 to 11 are controlled according to combination groups, each of which includes and is derived from a root combination. The root combination is a codical representation which is included in a group and which is common to all of the combinations comprising the group, and the roots may be of one or two-point designations. The combination groups according to which stops 3 to 8 are controlled have roots each consisting of a single point designation and the combination groups of stops 9, 10, and 11 have roots each consisting of a two-point combination.

In the combination groups having single point roots, the other three members of the group are obtained by supplementing the root by two other designations in combination. For example, the root of stop 3 is A, which is a single point root, as seen in the diagram to the right of Fig. 7. For the other members of the group, two other designations are selected and are added to the root. In this instance, the two designations selected are B and C and two other members of the group are A—B and A—C. For the remaining member of the group the two added designations are both used in combination with the root, and, in this instance, the fourth member is A—B—C. Therefore, the combination group according to which stop 3 is controlled is A, A—B, A—C, and A—B—C. Using B and C with A in this instance is, of course, a matter of choice. Any other two designations might have been used, the only requirements being that they are grouped with an assigned root first individually, and then in combination and that the scheme of the communication of a half lift from one bar to another be suitably arranged. It will be noted that the above group completely exhausts all of the combinations of B and C with A and, consequently, this stop cannot be affected by any combination other than those which comprise the group. This method of determining the combination group is considered to be novel and advantageous and is carried out on stops 3 to 8, all of which are derived from and include single-point roots.

Stops 9, 10, and 11 are controlled in accordance with combination groups having two-point roots. The other three members of each of these combination groups are obtained by supplementing each root by three different single-point designations. For example, the root of stop 9 is A—D, and B, C, and E are added to this root to round out the combination group which then consists of A—D, A—B—D, A—C—D, and A—D—E. It will be noted that A—D—F is also a derivation of the root A—D and, therefore, all of the combinations are not exhausted in this group. In this instance A—D—F is one of the combinations discarded and consequently would never affect this stop. If, however, A—D—F was used on another stop, the non-presence of the F designation in the above combination group would prevent the stop from being affected by the presentation of A—D—F to the permutation bars. It may be said at this point that if any permutation bar of a designation not included in a group be given a normal lift, it will act as a lock to the stop controlled according to that group. It may also be brought out at this point that before any stop can be affected, it is necessary to raise the bar or bars corresponding to the root of the combination group controlling that stop.

The notches cut in the right-hand edge of each permutation bar as shown in Fig. 7 are of varying shapes and have various purposes and functions which will now be described, considering only the notch in question. The nomenclature of notches which follows is used for the lack of a better.

An instance of a locking notch is shown in bar-B at 160 and the purpose of this locking notch is to permit its associated stop to advance four steps when the bar is not raised, but to lock said stop in retracted position should the bar be raised to the normal extent. It will be noted that locking notches are present wherever a designation is excluded from a group. For instance, on stop 9, the designation F is excluded from the combination group and, therefore, a locking notch is cut into the F bar, at the point where it is associated with that stop. It is apparent, therefore, that whenever the bar F is raised to its normal, or full extent, it serves to lock-out that stop. The bar F receives a half lift from the bar A which is included in this group, and the notch in question is, therefore, of such a width that the extent of lift will still permit the 9 stop to advance four steps.

A four-step release notch 161 allows its associated stop to advance four steps if the bar is raised and to lock the stop if the bar is not raised to its full extent. It will be observed that for each stop 85 four-step release notches are present on the bar or bars corresponding to the root designation. For instance, for stop 9, the root of group combinations is A—D and, consequently, four-step release notches are cut into bars A and D at the points where these bars are associated with the stop 9. Therefore, should the bars A and D be raised together, the stop 9 will be released for an advance of four steps. However, should either or both of the bars A and D fail to rise, it would result in locking out that stop.

A three-step release notch is shown, for example, in bar-D stop 11, at 162, and it serves to limit the advance of its associated stop to three steps should the bar be raised to its full extent and allow the stop a full advance of four steps if the bar does not rise to that extent. Three-step release notches are associated only with stops controlled in accordance with two-point roots. Referring again to stop 9 and to the diagram to the right in Fig. 7, it will be seen that the combination A—B—D is employed to limit the stop to three steps, and, therefore, a three-stop release notch is cut into the bar B at a point where it is associated with the stop 9. It is obvious that when the bar B is raised along with the root (bars A and D) it will limit the stop to three steps.

A two-step release notch 163 (bar E, at stop 11, for example) serves to limit its associated stop to a movement of two steps if the bar is fully raised and to allow the stop to advance to its full extent of movement of four steps if the bar is not fully raised. Two-step release notches are associated with all of the stops 3 to 11, inclusive, and function in a manner similar to that of the three-step release notch except the stop is limited to two steps instead of three.

A one-step release notch is shown at 164 (bar A, for example) and arrests its associated stop at one step if the bar is fully raised and allows the stop a movement of four steps if the bar is not fully raised. These one-step release notches are associated only with stops controlled according to two-point roots and operate in the same manner as the three-step release notch except they limit the movement of the associated stop to one step.

A combination notch 165 serves to allow its associated stop to advance three steps if the bar in which it is cut is fully raised or to limit the movement of the stop to one step if the bar is half lifted by the preceding bar. If the bar does not rise, the stop will be allowed to advance four steps as far as this notch is concerned. Combination notches are associated only with the stops which are controlled in accordance with combination groups having single-point roots and for a purpose which will presently appear. The combination notch is the only notch affected by the half-lift as all other notches are cut of sufficient width so as to prevent them from being affected by the half-lift which, as far as they are concerned, is functionless.

In order to clarify the functions of the various notches used to obtain the variable positions of the stops, reference is made to stop 3. This stop is controlled according to the combination group A, A—B, A—C, and A—B—C, the root of which is A. In this instance should the bar A be raised alone, stop 3 is free to advance four steps and the stop will arrest the plate 87 at the shoulder 870 and arrest the differential bar 86 at its initial position, in position to print zero. The raising of the bar A half-lifts bar F which is provided at this stop with a locking notch 160, but the half-lift imposed on bar F is ineffective as the bar must be fully raised independently in order to lock. When bar B is raised with A, the lower throat portion 167 of the combination notch 165 would serve to limit the stop to a three-step movement which would cause the stop to arrest the plate 87 at the shoulder 871 and allow the differential bar 86 to advance one type space and be arrested in position to print the letter "S." When bars A, B, and C are raised the two-step notch 163 on bar C would limit the advance of the stop to two steps and the stop would arrest the plate 87 at the shoulder 872 and the differential bar 86 would move two type spaces, and it would be arrested in position to print the number 1. When bars A and C are raised, bar C will half lift bar B and, bar B being provided with a combination notch at this point, will carry the tongue 166 of the combination notch into operative relationship with the stop and limit the stop to a one-step movement. The stop 3 then arrests the plate 87 at the shoulder 873 and the type bar is allowed to advance three type spaces to print the letter "T."

Fig. 8 illustrates the positions assumed by a set of permutation bars when bars A and C are raised and the tongue 166 of the combination notch 165 is seen limiting the movement of the stop to one step. It may also be observed from this figure that bar F has been half-lifted by the bar A, although the locking notch in F still permits the stop to move freely. All other stops controlled in accordance with combination groups having single point roots, function in the same manner as the one just described.

A problem which presented itself for solution was having one stop settable to four positions by using combinations embracing only three designations. This problem existed only in the notches associated with the stops controlled according to combination groups having single-point roots such as that just described on stop 3. Stop 3 is controlled according to the group of A, A—B, A—C, and A—B—C in which A allows the stop four steps, A—B allows it three steps, A—B—C limits it to two steps and A—C arrests it at one step. In developing the configurations of the notches, it was possible to have bar C release the stop four steps, bars A and B limit the stop to three steps and also to have bars A, B, and C check the stop at two steps, all by simply raising the bars in the three combinations mentioned; but, how to enable bars A and C to arrest the stop at one step was another and more difficult problem. It was finally brought to solution by the development of the so-called combination notch 165, and having another bar half-lift the combination notch into operative relationship with the associated stop. The combination notch actually controls the stop to two positions by allowing the stop to advance three steps whenever the bar is fully raised and by limiting the stop to a movement of one step when the bar is half lifted in association with another bar.

Referring to stop 9 which is controlled in accordance with a combination group having a two-point root, it will be seen that the group consists of A—D, A—B—D, A—C—D, and A—D—E of which A—D is the root. Should the bars A and D be raised, it will be seen that the stop 9 will be permitted a full movement of four steps. Should the bars A, B, and D be raised, the three-step release notch cut in bar B will limit the stop to three steps. Should bars A, C, and D be raised the two-step release notch in bar C will check the stop at two steps. Should the bars A, D, and E be raised, the one-step notch on bar E will arrest the stop after one step. These four different extents of movement will cause the stop 9 to arrest the differential bar in four different printing positions by engaging the shoulders 870, 871, 872, and 873 in the same manner as described in connection with stop 3.

All of the stops controlled according to combination groups having two-point roots are controlled in the same manner as stop 9.

Referring now to stops 3, 6, and 9, it will be remembered, in connection with stop 3, that, when the bar A was raised alone, it released stop 3 to four steps. When A was raised with D to effect stop 9, the raising of the bar D locked out stop 3. In the case where D is the root (stop 6), raising the bar A would lock out this stop. It will thus be seen that whenever a two-point root is presented to the permutation bars each of the stops controlled in accordance with the single-point roots contained therein is locked out by the presence of the additional designation.

The stop 2 is a so-called "erase" stop and serves to allow the operator to erase or render ineffective any previous punching in any column of a card. The notches with which this stop cooperates are formed in a manner so as to permit the stop to be released whenever a certain combination or any combination including that combination is presented to the unit. Of the 41 possible combinations of six points taken 1, 2 and 3 at a time, there remain 5 three-point combinations which are not used in controlling the stops already described. Of these, the combination A—C—E has been selected for erasing purposes. To this end, one-step release notches 168 are cut in the bars A, C and E and indifferent notches 170 are cut into the bars B, D and F. The indifferent notches 170 will permit the stop to be released regardless of the setting or non-setting of the bars in which such notches are cut. In the present case, they are cut into bars D, B and F. The one-step release notches 168 which are provided in the bars A, C, and E, will allow the stop to advance one step and engage a recess 874 in the plate 87 whenever these bars are fully raised in unison. Should any of the bars A, C, or E fail to rise fully, the stop 2 will be locked out and the differential bar 86 is then free to follow the vertical movement of the restoring bar 120 until said differential bar is arrested by another stop. Should any or all of the bars B, D and F be raised together with the bars A, C and E, the stop 2 would still be released and the differential bar would be locked against any vertical movement. It is obvious that whatever punching is already present in a card, if the operator desires to cause the punching to be ineffective or non-recordable, it is only necessary to punch in the desired column or columns holes corresponding to the designations A, C and E which will cause the bars A, C and E to be raised together.

The stop 1 is provided so as to prevent the differential bar from rising whenever its corresponding column in the card is imperforate. To this end all of the bars are formed with one-step locking notches 171, which permit the stop to advance one step when all of the bars fail to rise and to be locked out should any one or more of the bars be elevated. Should the stop 1 be released it will advance to engage a recess 875 cut into the plate 87 and retain the differential bar in its lowermost position.

As previously pointed out, the construction of the above described permutation unit is capable of controlling the differential bar 86 to thirty-six different positions, and utilizes thirty-seven of a possible forty-one codical representations of the type of code illustrated. Should it be desired to use the remaining four combinations for special purposes or for designations such as the period, dollar sign, cent sign, etc., it could be easily accomplished by adding another stop and having said stop controlled to four positions in accordance with the remaining codical representation. In the present instance, the remaining codical representations are A—B—E, A—D—F, B—C—F, and B—D—F. These combinations are shown in dotted lines at the top of the code diagram in Fig. 7. It is apparent by inspection that this group does not contain any common designation or combination and, therefore, has no root. Consequently, this stop would be subject to many accidental openings, but as the combinations causing the accidental openings control other stops below, any accidental opening would be functionless and would do no harm.

A little study of Fig. 7 will reveal a certain orderliness of arrangement. For example, notches of the same kind are disposed generally in diagonal lines in this figure. Note the combination notches 165. Also, the combinations are arranged in the order of the letters of the alphabet. Much of this orderliness is merely for convenience and some of it for mental satisfaction rather than from mechanical need. The groups numbered 3 to 11, inclusive, are independent of each other and may be arranged in any relative order. Group No. 7 could just as well occupy the position of group 3, and group 5 that of group 8. The pins 156 A-F, inclusive, may be replaced by other devices having the same effect. Thus, the pins 64 (Fig. 5) may be made forked or offset, with the right-hand branch a little shorter than the main pin, so that the B pin would lift the A permutation bar a half distance. Thus, in Figs. 13 and 14, the pins 640, which replace the pins 64 of Fig. 5 are made square to prevent turning and they have branches 641 extending horizontally from the B, C, D, E, and F pins so as to underlie each the next toe 70 to the right of it and at a distance from the top of the pin about equal to one half of the distance through which the pin rises when actuated. The A pin has a branch 642 extending under the foot 70 of the F pin. In Fig. 14 the A and D pins have been elevated, and the branch 642 of the former has raised the F pin a half distance and the branch 641 of the D pin has raised the C pin a half distance. In short, the system illustrated is subject to considerable modification in details and arrangement.

In no instance can a combination appropriate to one stop release any other below it. Six of the stops are controlled each by a group of four combinations having a one-point root. Stop 8, for example, is controlled only by bar F and three combinations with F of A and B, and these three are the only combinations of A and B with F that exist. This leaves three bars, C, D and E that are not used for stop 8, and all of these are made with locking notches which prevent the release of stop 8 if any one of them is raised. Since the group for stop 8 exhausts all existing combinations with F of A and B, any other combination with F must necessarily include one or more of the bars C, D and E. Stop 8 cannot be released except by F and it cannot be released if C, D or E is raised. Therefore, this stop cannot be released by any combination whatever except the four assigned to it. A similar analysis applies to each of stops 3-7.

For stops 9, 10 and 11, the six designations are divided between three root combinations of two designations each, no designation being repeated. Obviously, in a six point code three such roots are possible. In each group the four several combinations consist of the root and of the root combined with three other designations. This obviously leaves in each group one code bar which is not used, and this one is provided with a locking notch. A little study of these three groups will show that it is impossible that any one of them could contain a representation that would release either of the other two stops. For example, every combination in group 11 must contain both C and F, and it is impossible for any such three-point combination to contain also both B and E, which it must do to release stop 10, or to contain both A and D which it must do to release stop 9.

It has already been shown that each of the stops 3–8 can be released only by the four combinations assigned to it. Consequently, no combination contained in any of groups 3–11 could release any other group. It will be perceived that this freedom from conflict is inherent in the principles according to which the code and the means for interpreting it are constructed.

Figure 10:
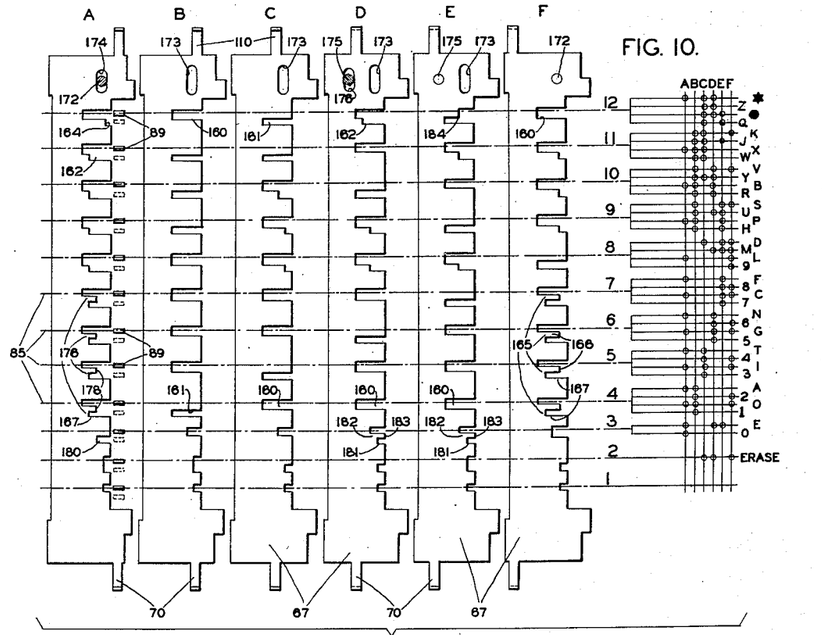
Fig. 10 is a view similar to Fig. 7 showing a modified form of a set of six permutation bars which utilize the regular Powers numerical code.

Figs. 10 and 11 show a modification of the invention which utilizes the regular Powers numerical 90-column code, in order that the invention may be used in conjunction with the cards, sorters and punches which are at present in use and on the market. In the instance illustrated in Fig. 10, twelve stops 85 control the printing positions of twenty-six alphabet characters, ten numerical characters, two designations (in this instance, the period and the asterisk), an erasing function and a stop to prevent the differential bars from rising whenever a column in a card is imperforate.

It will be observed in Fig. 10 that most of the combination groups have each a root and that all the possible combinations of the root are exhausted, as in the first described form; but in some instances, namely, stops 3, 8 and 12, this system has been deviated from for the reason that the Powers numerical code utilizes the designation F in combination with other designations for all the even numbers, and F alone is used to represent "9." This excessive usage of the designation F, exhausts that designation to such an extent that it limits the number of available F designations of the remaining codical representations with which to compose the combination groups controlling the other stops. This partial exhaustion of the F combinations was particularly noticed when developing the combination group for stop 8, as, in this instance, F was the root and all but one of the two-point combinations of F had been exhausted on the stops below in obtaining the representations of the even numbers in accordance with Powers code. It will be remembered, that in the preferred method of composing a combination group having one point root, that two two-point combinations and one three-point combination were used. However, in the case of the stop 8 of Fig. 10 with the single-point root F, only one two-point F combination is available and, therefore, two three-point combinations are used to complete the group.

Another deviation from the preferred form of composing the combination groups may be found on stop 12. This combination group contains no definite root and here the departure from the preferred method of obtaining the group was caused by the constant previous use of the A and F designations. The excessive use of A and F is apparent by observing the diagram to the right in stops 4, 5, 6, and 7.

Another deviation will be found on stop 3. This stop is controlled to only two positions and the combinations according to which this stop is controlled are A and A—D—E. In this instance, a two-point combination including A might have been advantageously employed, but all of the two-point combinations of A had been exhausted on the stops 4, 5, 6, 7, and 8. These stops 3, 8, and 12 will be described in detail later.

The arrangement according to which an operation of one permutation bar is accompanied by a half-lift of another, has been modified. In this form the A and F bars are provided with means to half-lift one another and also the D and E bars are constructed to half-lift one another and no other half-lifts are employed. To these ends, the bar F is provided with a pin 172 which passes freely through relatively long slots 173 in bars B, C, D, and E and engages a shorter slot 174 cut in bar A. The space between the top of the pin and the top of the slot 174 is equal to one-half of the normal lift of the bars. The same space also exists between the bottom of the pin and the bottom of the slot, consequently, should A be raised it will half-lift F and if F be raised it will half-lift A. The slots 173 are too long to be affected by these movements. Likewise bar E is provided with a pin 175 which engages a slot 176 in bar D in such a manner that the bars E and D will half-lift one another. The purpose of this function will be seen in the description to follow.

It will be remembered that in the preferred form, each stop which was controlled in accordance with a combination group having a single point root, was associated with a combination notch in order to obtain the one-step position of the stop. In the modified form, each such stop, excepting stops 3 and 8 as will be explained later, is associated with two combination notches. As will be seen in Fig. 10, these combination notches are present only on the A and the F bars and are associated with the stops 4, 5, 6, and 7. The combination notches present on bar F are of the same shape and have the same function of those described in connection with the preferred form and, therefore, are given the same reference character 165. As in the preferred form, these notches will allow the associated stop a three-stop movement if the bar is fully raised, and to limit the stop to one step if the bar is carried to its half-lifted position by the raising of the bar A. The combination notches 176 cut in bar A are of such a shape as to allow the associated stop to advance three steps if the bar A is fully raised or to limit the movement of the stop to two steps if the bar A is half lifted by the bar F.

Stops 4, 5, 6, and 7 are operated in a like manner and, therefore, description of stop 4 will suffice for all. Stop 4 is controlled in accordance with the combination group B, A—B, B—F, and A—B—F, of which B is the root. In Powers code, B represents the numeral "1" and BF represents "2." Therefore, for obvious mechanical reasons, B must advance the stop to four steps and B—F must limit the stop at two steps. B, being the root in this instance is provided with a four step release notch 161 and upon being raised alone will allow the stop to advance four steps. Should A—B—F be raised together the stop will be checked at three steps by the throats 167 of the combination notches 165 and 176. When the bars B and F are raised together the raising of the F bar will half-lift the A bar and the tongue 178 of the combination notch 176 will be carried into operative relationship with the stop, and will limit its movement to two steps. Whenever the bars A and B are raised together, the bar A will half-lift the F bar and the tongue 166 of the combination notch 165 will be carried into operative relationship with the stop and the stop will be arrested after a movement of one step. These different extents of movement of the stop serve to variably position the differential bar 86 in the same manner as described in connection with the preferred form by arresting the plate 87 at its various shoulders 870, 871, 872, and 873.

Stops 9, 10, and 11 (Fig. 10) are each controlled by combination groups having double roots. These stops operate and the combination groups are obtained in the same manner as described in connection with the similar groups of the preferred form, although they are not identically the same.

It will be noted that stop 3 is controlled in accordance with only two combinations and, therefore, controls the differential bar to only two positions. The reason for this is as follows: It is contemplates using this device in Powers tabulating machines of the type shown in the prior Lasker-Mueller application and in this event the differential bars would actuate totalizers indicated at 22, Fig. 1. The spacing of the rack teeth 119 of the differential bar is equal to the spacing of two printing types 122 and it, therefore, follows, when the device herein described is employed to position the differential bars for accumulating purposes, that numeral type occupy every other space on the type bar and are interspersed with alphabet type. In the present instance, the type bars are normally at zero and, therefore, the code combination representing "0" is such as to release a stop and arrest the differential bar in its lowermost position and the representation of "1" is such as to permit a stop to arrest the differential bar two type spaces above the "0" and so on. The regular Powers code for "0" is an A and "1" is represented by B. A and B are both single-point designations and, therefore, must be on separate stops. Consequently, "0" is controlled from stop 3 and "1" is controlled from stop 4. To provide for this mode of operation, the spacing of the stops relative to one another and relative to the plate 87 is modified. In Fig. 5, stop 3 is on the level of the uppermost step 870 and the stops above it are at four-space intervals. In Fig. 11, stop 3 is on the level of the third step 872, stop 4 is two spaces above the upper stop 870, and the following stops at four-space intervals. If the machine was used only for printing, however, this would not be necessary and the arrangement shown in the preferred form could be used. The stop 3 (see Fig. 11) is given two extents of movements, namely, a two-step movement and a one-step movement. When the stop 3 is given a two-step movement, it retains the differential bar in its lowermost position by arresting the plate 87 at the shoulder 872 to print "0." Whenever the stop is given a one-step movement the plate 87 is arrested at the shoulder 873 and the type bar is allowed to advance a type space higher and print "E." It will be seen from Fig. 11 that when the stop 4 is given a full movement of four steps the plate 87 advances two type spaces from the zero position and will be arrested at the shoulder 870 and print "1."

Stop 3 (Fig. 10) is controlled in accordance with two combinations, A and A—D—E. Whenever "A" is raised alone, the two-step release notch 180 allows the stop to arrest the shoulder 872 of the plate 87 and position the differential bar to print "0." Whenever the bars D and E are raised with bar A, the lower throat portions 181 of the combination notches 182 cut into the bars D and E will limit the movement of the stop to one step and the stop will arrest the plate 87 at the shoulder 873, and the differential bar will be arrested in a position to print "E." The two combinations A and A—D—E fail to exhaust all of the combinations of A with D and E. The remaining combinations AD and AE are not available, being used for stops 6 and 7, and, unless provision is otherwise made, these combinations will release stop 3, and render 6 and 7 ineffective. If a two-point combination including "A" had been used instead of the three-point, this condition would not have existed. To meet it, means have been devised to lock out the stop 3 whenever A—E or A—D was presented to the unit. The problem was solved by another application of the half-lift and combination notch principle. The bars D and E are connected by a pin 175 in one bar playing in a slot 176 in the other so proportioned that either bar may half-lift the other. The combination notches 182 are each provided with a tongue 183 at its half-lift position, which is adapted to act as a lock for stop 3 whenever one bar is lifted by the other. For instance, should the bars A and E be raised, the E-bar would half-lift the D-bar and the stop will be locked out, and the differential bar is free to move upward until arrested by the stop controlled by A—E. This is also true if the bars A and D be raised. In this case the D-bar will half-lift E to lock out the stop. It is, therefore, obvious that the D and E bars can release the three-stop only when both are raised in unison with the root A.

Stop 8 is controlled by a combination group having F (Powers code for 9), as its root; the other members of the group being A—F, D—E—F, and C—E—F. As previously pointed out, the composition of this group is a departure from the preferred method of composing the subordinate members of a group derived from a single-point root. This departure was caused by the frequent use of the F designation on the stops below stop 8 in representing the even numbers of Powers code. Therefore, the group does not exhaust all of the designations used in combination with the root and the stop is subject to accidental openings. The combinations not included in the group and which will accidently release the stop 8 are A—D—F, A—C—F, A—E—F, C—D—F, E—F, C—F, and D—F. It will be noted, however, that all of these combinations control stops below stop 8 and, consequently, whenever they are presented to the permutation bars, the stop which they are intended to control will take precedence over the accidently released stop 8.

Stop 12 is responsive to four miscellaneous combinations, having no definite root, and which remain available after the combination groups relating to stops 2 to 11 have been composed. The group comprises C—E, C—D, C—D—E, and A—C—D and functions as follows: When the C and E bars are raised, the stop is allowed a full movement of four steps. Should the C and D bars be raised, the stop will be limited to two steps against the shoulder 184 cut in bar E. Whenever C, D and E bars are raised, the three-step release notch 162 cut in bar D will arrest the stop after a three-step movement. When the bars A—C—D are raised, the one-step release notch 164 cut in bar A will limit the stop to a movement of one step. Stop 12 is accidentally released by the combinations C, A—C, and A—C—E. Since C and A—C are used on stops below stop 12 and A—C—E is discarded, the accidental releasing of stop 12 by these combinations does not affect the operation of the device. Other accidental releases are prevented by bar C which normally locks this stop.

Stop 2 is the so-called erasing stop corresponding to stop 2 of the preferred form and operates in the same manner except the controlling designation has been changed to C—D—F.

Stop 1 also operates in the same manner as described in connection with the preferred form.

In the mechanism illustrated in Fig. 10, in no instance can a combination appropriate to one stop release any stop below it. Stop 4, for example, is controlled in the same way as in the other form of the invention. Its combination group has B for its root, and it includes all possible combinations of B with A and F. Any other combination with F must, therefore, include either C, D or E, and the three bars so designated all have locking notches. As the stop can be released only by F and is locked by any remaining combination, including F, it can be released by no combination other than the four assigned to it. The same is true of stops 5, 6, and 7. Stop 8 can be released only by F, and it is locked by any combination containing B. B is included in all of the combinations above it except those of group 12, which do not contain F. Stop 10 cannot be released without raising D, which is not included in group 11; nor without raising B which is not included in group 12. Stop 11 cannot be released without B which is not included in group 12. Stop 3 is locked by B, C and F, which are included in the roots of all groups above it except groups 5 and 6. These also lock it in the manner explained hereinbefore.

It will be observed by comparing Fig. 7 with Fig. 10, that the modified form of permutation bars requires the use of an extra stop. This is because the "0" and "1" are controlled by separate stops and the stop controlling "0" controls only two positions of the differential bar as previously described. Should the modification control thirty-six printing positions as does the preferred form, stop 12 would also control two positions. Consequently, there are two extra controlling positions of stop 12 available and they are utilized to control the printing of two designations.

It will be seen that by using thirty-eight types instead of thirty-six, the throw of the restoring bar 120 would be correspondingly lengthened. Another minor mechanical change is in the spacing between stops 3 and 4. This is occasioned by the fact that stop 4, controlling "1" must initially arrest the differential bar two type spaces from where it is initially arrested by stop 3, controlling "0" as previously explained. This change of spacing is clearly seen in Fig. 11 upon comparing the spacing between stops 3 and 4 and between stops 4 and 5.

The present invention is illustrated as applied to a machine containing some of the elements of the tabulating machine disclosed in the Lasker-Mueller application. The present applicant is not the inventor of anything disclosed in the said Lasker-Mueller application. Applicant's invention consists solely of the improved mechanism employed to interpret combinational code, as recited in the following claims.

While I have described what I consider to be a highly desirable embodiment of my invention, it is obvious that many changes in form could be made without departing from my invention, and I, therefore, do not limit myself to the exact form herein shown and described, nor to anything less than the whole of my invention as hereinbefore set forth, and as hereinafter claimed.

What I claim as new and desire to secure by Letters Patent is:

1. In a machine for interpreting codical representations, the combination which includes a feeler to be set from a normal position to four different set positions, three notched code bars sensed by said feeler and whose outlines control the setting of said feeler, each of said bars corresponding to a codical designation the first of which designations is the root of four codical representations, the first said code bar having a four-step release notch, the second a combination three-step and one-step notch and the third bar having a two-step notch, means controlled by a record in code for selectively displacing said three bars to definite extents in response to their respective codical designations, means associated with the said displacing means for the third code bar and rendered operative when the latter is operated and the displacing means for said second bar is not operated for causing said second code bar to be displaced to an extent different from that to which it is displaced by its first displacing means.

2. In a machine for interpreting codical representations, the combination which includes a plurality of feelers each to be set to four set positions in response to a group of four codical representations, said four codical representations in each instance consisting of combinations of three designations of which one is the root of the group, a plurality of notched code bars sensed by said feelers and by their outlines controlling the said setting of said feelers, and each code bar notched to control different feelers according to codical representations of different groups; means for imparting to said code bars selectively definite displacements in response to their respective designations; and means for causing certain code bars to be displaced to a lesser extent, said means in each instance being associated with the aforesaid displacing means for another code bar and rendered operative when the last mentioned displacing means is operated in response to the designation of said other code bar, the code bar receiving such lesser displacement being notched to limit the advance of the selected feeler to determine the fourth position of said feeler; and the code bar which is so displaced to a lesser extent being different in the different groups.

3. In mechanism for interpreting codical representations, the combination of four feelers (4, 5, 6, 7) to be advanced selectively each to four set positions, six code bars (A, B, C, D, E, F) notched to control such advance of said feelers, means for displacing said code bars selectively according to the code in such wise that a lesser displacement of one bar (A) always accompanies a codical displacement of another (F) and vice versa, each of the remaining four code bars having a four-step releasing notch, said four-step notches being so distributed that each of the four feelers cooperates with one such notch, and said one bar (A) and said other bar (F) each having a combination notch for all of said feelers, said combination notch for each feeler in at least one of said two bars defining a three-step advance to the feeler, and the combination notches in said two bars having intermediate stops one allowing a two step and the other a one-step advance to the feeler, whereby, when one of the four remaining bars (B, C, D, E) is displaced alone its associate feeler may advance four steps, when the last said bar and said other bar (F) are displaced together the feeler may advance two steps, when the last said bar and said one bar (A) are displaced together the feeler may advance one step, and when said bar and the first two identified bars (A and F) are all displaced together the feeler may advance three steps.

4. In a device for interpreting code, in combination, a plurality of notched code bars, feeler bars associated with the notches in said bars, means for displacing said code bars, means for moving said feeler bars to sense said notches, each of said code bars associated with means to set another code bar to a mid-position when displaced, each of said feeler bars associated with a series of notches which allow said feeler bar four extents of movements by displacing a maximum of three of said code bars, a notch cut in the first of said three code bars being so shaped that said first code bar must be displaced before any extent of movement is given to the feeler bar, said first bar constituting a root and setting said feeler bar to one of its four positions, a combination notch cut in a second code bar of said three code bars being so shaped as first to set said feeler bar to a second position when said second code bar is operated in conjunction with said first code bar and second, to set said feeler bar to a third position when said combination notch is set to a mid-position by the actuation of the third code bar of said three code bars in conjunction with the actuation of the said first code bar, a notch cut in said third code bar being so shaped as to set said feeler bar to a fourth position by the simultaneous actuation of all three said code bars, and the remaining code bars being so shaped as to prevent movement of said feeler bar by displacement of any of said remaining code bars.

5. In a device for interpreting code, the combination of six notched code bars, means for selectively displacing said code bars in accordance with combinational code, a series of feeler bars associated with the notches in said bars, means for actuating said feeler bars to sense said notches and allowing one of said feeler bars an extent of movement determined by said notches, each of said feeler bars being associated with a series of notches so shaped as to allow said feeler bar four extents of movement by the displacement of a maximum of three of said code bars, a notch in the first of said three code bars being so shaped that said first code bar must be actuated before any extent of movement can be given to said feeler bar, said first code bar forming a root and setting said feeler bar to one of its four positions, a second bar of said three code bars having a combination notch, means for setting said second bar to a mid-position by displacement of the third bar of said three code bars, said combination notch being shaped to set the said feeler bar to a second extent of movement when said bar is displaced in conjunction with the said first bar and to set the said feeler bar to a third position when said combination notch is set to a mid-position by the displacement of said third bar in conjunction with the displacement of the said first bar, a notch in the third bar of said three code bars being so shaped as to set said feeler bar to a fourth position when all of said three code bars are displaced simultaneously, and notches in the other three code bars being so shaped that displacement of any of the said other three code bars will prevent any extent of movement of said feeler bar.

6. In a device for interpreting code, the combination of a set of six notched code bars, means for selectively displacing said code bars in accordance with a code, means for imparting to one of said code bars by the displacement of another of said code bars a displacement different from that received by it in accordance with the code, said code bar being notched to control two positions of a feeler, a series of feeler bars associated with the notches in said bars, means for actuating said feeler bars to sense said notches, one of said feeler bars advancing to an extent determined by said notches, each of said feeler bars being associated with notches so shaped as to allow said feeler bar four positions by operation of a maximum of three said code bars, notches in said three code bars for cooperation with each certain feeler being shaped so that a certain one of said three code bars must be displaced before any extent of movement is given to said feeler bar, said one code bar forming a root and setting said feeler bar to one of its four positions, a second of said code bars being displaced in conjunction with the root bar to set said feeler bar to its second position, said second bar having imparted thereto the aforesaid different displacement concomitantly with a setting of the third code bar to control the third position of said feeler bar, and all three said code bars being operated simultaneously by said first mentioned means to set said feeler bar to a fourth position, notches in the remaining code bars being so shaped that displacement of any of said remaining code bars will prevent any movement of said feeler bar.

7. In a device for interpreting code, the combination of a set of code bars, means for selectively displacing said code bars each to a definite position in accordance with a combinational code, a vertical series of notches cut in one edge of each of said code bars in such a manner that when said code bars are assembled face-to-face said notches form a plurality of horizontal series of notches, a plurality of feeler bars each associated with one of said horizontal series of notches, means for causing each of said feeler bars to sense its horizontal series of notches, each horizontal series including a pair of combination notches, and means for displacing each combination notch to a mid-position when the code bar in which the other combination notch is cut is displaced by the first mentioned means, each combination notch presenting to its feeler bar a certain depth of notch when displaced to its said definite position and another depth of notch when displaced to its said mid-position.

8. In a device for interpreting code, the combination of six code bars, means for selectively displacing said code bars in accordance with a combination code, each of said code bars having notches cut in one edge thereof, a series of feeler bars associated with said notches, means for causing said feeler bars to sense said notches, one of said feeler bars advancing to an extent determined by said notches, said notches allowing each of said feeler bars four extents of movement by the displacement of a maximum of three of said code bars, the notches for each of said feeler bars being so designed that displacement of the first of the three code bars which set a particular feeler bar is necessary in order to allow any extent of movement to said feeler bar and will allow a setting of said feeler bar to one of its four positions, said displacing means including means common to the other two of said three code bars for displacing each of them to a mid-position when the other of said two code bars is displaced, the design of said notches being such that a second position of said feeler bars is obtained when the first of said three code bars is displaced in conjunction with the second of said three code bars, and that a third position of said feeler bar is obtained when the first of said three code bars is displaced in conjunction with the third of said three code bars, and such that the fourth position of said feeler bar is obtained when all three of said three code bars are displaced simultaneously, the outlines of the code bars other than said three code bars being such that movement of said feeler bar is prevented whenever any of said other code bars is displaced.

9. In a record controlled machine, the combination of sensing mechanism including three sensing pins, code interpreting mechanism including a feeler and three notched code bars (E, A and F), means whereby the first of said sensing pins causes a displacement of a code bar (E), means whereby the second sensing pin causes displacement of two code bars, (A and F), and means whereby the third sensing pin causes a displacement of one (F) of the code bars displaced by the second pin but to a different extent, whereby said one code bar (F) is displaced to one extent when the third sensing pin finds a hole in the card and to a different extent when the second pin does and the third pin does not find a hole; and said code bars having appropriate notches to control different settings of said feeler by different settings of said code bars.

10. The combination of a plurality of code bars having notches of different depths therein and displaceable in response to codical representations of a record punched according to a combination code, means for displacing one of said code bars in response to a first designation, means for displacing another of said code bars in response to a second designation, and means associated with the second displacing means and rendered operative when said second displacing means is operated and the first displacing means is not operated for causing said first code bar to be displaced to an extent different from that to which it is displaced by the first displacing means, whereby different depths of notch of said first code bar are brought to active position in the two instances, and a feeler set differentially under the control of the notches of the code bars.

11. A plurality of code bars having notches of different depths therein, one such code bar responding to each designation of a combination code; a plurality of feelers, each settable differentially under the control of three of said code bars; means for displacing said code bars selectively in response to codical representations, one, two and three bars at a time, the three bars which control each particular feeler including a first or root bar which is so notched as to release said feeler and to limit its advance to a certain extent, a second and a third bar so notched as to limit the advance of said feeler to other extents thus affording three settings to said feeler; and means associated with the displacing means of said third bar and rendered operative when said third bar displacing means is operated and the second bar displacing means is not operated for causing said second code bar to be displaced to an extent different from that to which it is displaced by said second displacing means, whereby a fourth depth of notch is presented to the feeler.

12. The combination of a set of sensing pins having uniform excursions for sensing perforated records, code bars notched to differential depths, said code bars being displaced to definite extents by said pins according to a combination code, one code bar for each pin, means for displacing certain of said code bars each to a lesser extent, each said means associated with the pin for another code bar and rendered operative when said other pin is operated and the pin for said certain other bar is not operated, and one or more feelers differentially set according to the depth of the notches presented thereto by the code bars displaced as above, said certain code bar so presenting different depths of notch in its two displaced positions.

13. In the code translating mechanism of a record controlled machine having pins to sense a punched record, the combination of code bars having notches of different depths, means controlled by one of said pins to displace two of said code bars, and means controlled by another of said pins to displace one of said two code bars to a different extent to bring to active position a different depth of notch in said one code bar; and a feeler to sense the notches in said bars.

AUGUST H. MASCHMEYER.